United States Patent [19]
Kusanagi

[11] Patent Number: 5,946,057
[45] Date of Patent: Aug. 31, 1999

[54] LIQUID CRYSTAL DISPLAY HAVING ELECTROSTATIC DISCHARGE DAMAGE PREVENTION

[75] Inventor: Tomohiro Kusanagi, Tokyo, Japan

[73] Assignee: NEC Corporation, Tokyo, Japan

[21] Appl. No.: 08/864,370

[22] Filed: May 28, 1997

[51] Int. Cl.⁶ .......................... G02F 1/136; G02F 1/1339; G02F 1/1345

[52] U.S. Cl. ............................ 349/40; 349/139; 349/155; 349/153

[58] Field of Search .................................. 349/40, 41, 42, 349/50, 139, 155, 153; 345/87, 92; 257/59, 72, 355, 356, 357, 358, 359, 360; 361/56, 61

[56] References Cited

U.S. PATENT DOCUMENTS

| | | | |
|---|---|---|---|
| 5,521,728 | 5/1996 | Kodate et al. | 349/149 |
| 5,606,340 | 2/1997 | Suzuki et al. | 349/42 |
| 5,657,139 | 8/1997 | Hayashi | 349/40 |
| 5,671,026 | 9/1997 | Shiraki et al. | 349/42 |
| 5,677,745 | 10/1997 | Kawano et al. | 349/139 |

FOREIGN PATENT DOCUMENTS

| | | |
|---|---|---|
| 61-89819 | 6/1986 | Japan . |
| 62-218937 | 9/1987 | Japan . |
| 4-153625 | 5/1992 | Japan . |

Primary Examiner—William L. Sikes
Assistant Examiner—Tai V. Duong
Attorney, Agent, or Firm—Sughrue, Mion, Zinn, Macpeak & Seas, PLLC

[57] ABSTRACT

In order to prevent a liquid crystal display (LCD) from being damaged by electrostatic discharge, a plurality of static voltage discharging circuits are provided within the display. The LCD includes a first and second transparent substrates provided in a manner wherein they oppose each other and are spaced apart by a predetermined distance. The first substrate has one surface on which a color filter is deposited. The color filter is entirely covered with a common electrode. The second substrate carries a plurality of pixel electrodes in matrix and a plurality of thin film transistors. Another electrode is deposited at a periphery of one surface of the second transparent substrate. A plurality of lines, for thin film transistors, including column and row lines, and are deposited on the one surface of the second transparent substrate. The plurality of lines respectively extend to the corresponding thin film transistors. The static voltage discharging circuits are respectively provided between the electrode on the periphery of the second substrate and the plurality of lines. The static voltage discharging circuit is responsive to a predetermined static voltage appearing on each of the plurality of lines.

1 Claim, 7 Drawing Sheets

LIQUID CRYSTAL DISPLAY HAVING ELECTROSTATIC DISCHARGE DAMAGE PREVENTION

BACKGROUND OF THE INVENTION

1. Field of the Invention

The present invention relates generally to a liquid crystal display (LCD) and more specifically to a LCD which is provided with measures for shunting or discharging static electricity which may be generated during fabricating and/or repairing the LCD.

2. Description of the Related Art

As is known in the art, LCDs are commonly used in portable computers and other small, microcomputer-controlled devices for displaying data and graphics generated by these devices.

Before turning to the present invention it is deemed preferable to briefly describe, with reference to FIGS. 1 to 3, a conventional LCD which is disclosed in Japanese Laid-open Patent Application No. 4-153625.

FIG. 1 is a sectional view of a conventional active matrix type LCD which is generally denoted by numeral 10. FIG. 2 is a plan view of part of a TFT (thin film transistor) substrate on which various elements including TFTs are disposed, while FIG. 3 is a perspective view of a liquid crystal seal provided on another transparent substrate.

The LCD disclosed in the aforesaid Japanese Patent Application is directed to a liquid crystal seal which, in addition to confining a liquid crystal layer, is able to electrically interconnect two electrodes respectively provided on opposing two substrates. Other than this, the arrangement is well known in the art and thus, only a brief description thereof will be given for simplifying the disclosure.

As shown in FIG. 1, two transparent (e.g., glass) substrates 12 and 14 are provided in a manner wherein they oppose each other and are spaced apart by about 10 μm (for example). Throughout the instant disclosure, the substrate 14 is referred to as a TFT substrate in that the main element disposed thereon is the TFTs. A liquid crystal layer 16 is confined in a space defined by the substrates 12 and 14 along with a liquid crystal seal 18. This seal 18 is provided at the periphery of each of the substrates 12 and 14 and is sandwiched therebetween. A pair of polarizers 20 and 22 are respectively attached to one of the major surfaces of each of the substrates 12 and 14 as shown in FIG. 1. The substrate 12 carries a color filter 24 on its inboard surface. The color filter 24 is substantially entirely covered by a common electrode 26 which is then coated with an alignment layer 28.

As best shown in FIG. 2, the TFT substrate 14 supports a plurality of bonding pads 30 and 32, an electrode 34, a plurality of pixel electrodes 36 arranged in matrix, a plurality of MOS (metal oxide semiconductor) TFTs 38 respectively coupled to the corresponding pixel electrodes 36, a plurality of column (e.g. drain) lines 40, and a plurality of row lines (e.g., gate) lines 42, and a lead 44 for electrical interconnection between the pad 32 and the electrode 34.

The liquid crystal seal 18 is formed, using a known screen printing technique, at the periphery of one major surface of the substrate 12 in the manner shown in FIG. 3. Thereafter, the substrate 12 is aligned and pressed on the TFT substrate 14 under a high temperature ranging from about 150° C. to 230° C., whereby the seal 18 is secured between the substrates 12 and 14. It is to be noted that the liquid crystal seal 18 is provided with an opening for injecting a liquid crystal material. This opening is closed or sealed when the liquid crystal layer 16 is established. The closed opening is indicated by numeral 45.

The liquid crystal seal 18 is generally comprised of epoxy resin and is functionally divided into a first portion (depicted by A) and a second portion (depicted by B) as indicated in FIG. 3.

That is, the first portion A is pressed on the electrode 34 (FIG. 2) and includes a plurality of electrically conductive spherical spacers 46 (FIG. 1) which are embedded in the epoxy resin. Each conductive spacer 46 is a plastic bead (for example) which is coated with silver, gold, etc., which is elastically deformable, and which has a diameter slightly larger than a space between the substrates 12 and 14, in which the spacer is disposed. Therefore, the spacers 46 are able to establish electrical connections between the electrode 34 and the common electrode 26. More specifically, the reason that the conductive spacers 46 are embedded for the purpose mentioned above is that the lower surface of the substrate 12 is not provided with any electrode for directly supplying electricity to the common electrode 26.

The second portion B of the seal 18 is disposed on the peripheral portion of the TFT substrate 14 in addition to the electrode 34, as indicated by dashed lines in FIG. 2. This second portion B includes a plurality of non-conductive spherical spacers 48 which are also embedded in the epoxy resin. Each of the non-conductive spacers 48 is a plastic bead (for example), which is elastically deformable, and has a diameter slightly larger than a space between the substrates 12 and 14, in which the spacer is provided.

Further, in order to secure a predetermined distance between the substrates 12 and 14, in the region of the liquid crystal layer 16, a plurality of spacers 50 are provided in the manner shown in FIG. 1.

When the LCD 10 is installed in a device, a backlight is applied from behind the polarizer 22 as shown in FIG. 1.

The above mentioned conventional LCD, however, does not give any attention to preventing damage by electrostatic discharge which may occur during fabricating the LCD and/or repairing the same.

More specifically, as is well known in the art, a plurality of TFT substrates 14 are fabricated on a large single glass plate at the same time. After the deposition of elements such as TFTs on the glass plate is finished, the glass plate is cut into individual substrates 14. When cutting the glass plate, static electricity may be developed and stored on the substrates 12 and 14. Further, the same discussion may hold while transporting and handling the TFT substrates. Still further, after an LCD equipped device is handed to a user, when the top polarizer 20 is damaged and to be replaced by a new one, undesirable static electricity may accumulate on the substrate 12 (and 14) during the repairing. All TFTs are extremely susceptible to gate oxide breakdown, caused by electrostatic discharge. Therefore, it is important to consider how to cope with the damage by electrostatic discharge.

In addition to the aforesaid conventional LCD disclosed in Japanese Patent Application No. 4-153625, each of Japanese Utility-model application No.61-89819 and Japanese Laid-open patent application No. 62-218937 discloses a liquid crystal seal which includes a plurality of conductive spacers similar to the spacers 46. However, none of these provide any teaching or suggestion for preventing an LCD from being damaged by electrostatic discharge.

SUMMARY OF THE INVENTION

It is therefore an object of the present invention to provide an improved LCD which is provided with measures for preventing damage by electrostatic discharge.

In brief, this object is achieved by techniques wherein in order to prevent a liquid crystal display (LCD) from being damaged by electrostatic discharge, a plurality of state voltage discharging circuits are provided within the display. The LCD includes a first and second transparent substrates provided in a manner wherein they oppose each other and are spaced apart by a predetermined distance. The first substrate has one surface on which a color filter is deposited. The color filter is entirely covered with a common electrode. The second substrate carries a plurality of pixel electrodes in matrix and a plurality of thin film transistors. Another electrode is deposited at a periphery of one surface of the second transparent substrate. A plurality of lines for thin film transistors, including column and row lines are deposited on the one surface of the second transparent substrate. The plurality of lines respectively extend to the corresponding thin film transistors. Static voltage discharging circuits are respectively provided between the electrode on the periphery of the second substrate and the plurality of lines. The static voltage discharging circuit is responsive to a predetermined static voltage appearing on each of the plurality of lines.

An aspect of the present invention resides in a liquid crystal display composing: a first transparent substrate having one surface on which a color filter is deposited; a first electrode entirely covering the color filter; a second transparent substrate disposed opposite said first substrate and spaced therefrom by a predetermined distance, said second transparent substrate carrying a plurality of pixel substrates and a plurality of thin film transistors; a second electrode deposited at a periphery of one surface of said second transparent substrate; a plurality of lines for controlling the thin film transistors, said plurality of lines consisting of column and row lines deposited on said one surface of said second transparent substrate and respectively extending to the corresponding thin film transistors; and static voltage discharging members provided between said second electrode and each of said plurality of lines, said static voltage discharging members being responsive to a predetermined static voltage appearing on each of said plurality of lines.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
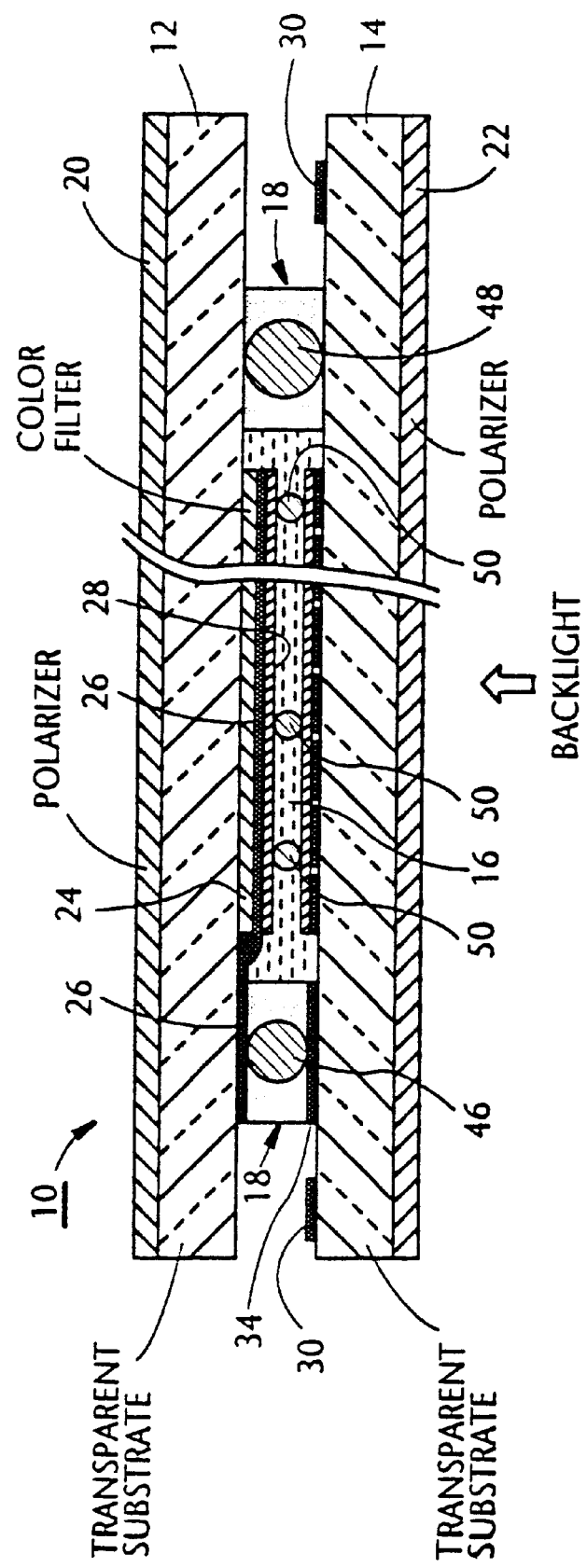
FIG. 1 is a sectional view of a conventional active matrix type LCD, referred to in the opening paragraphs of the instant disclosure.
Figure 2:
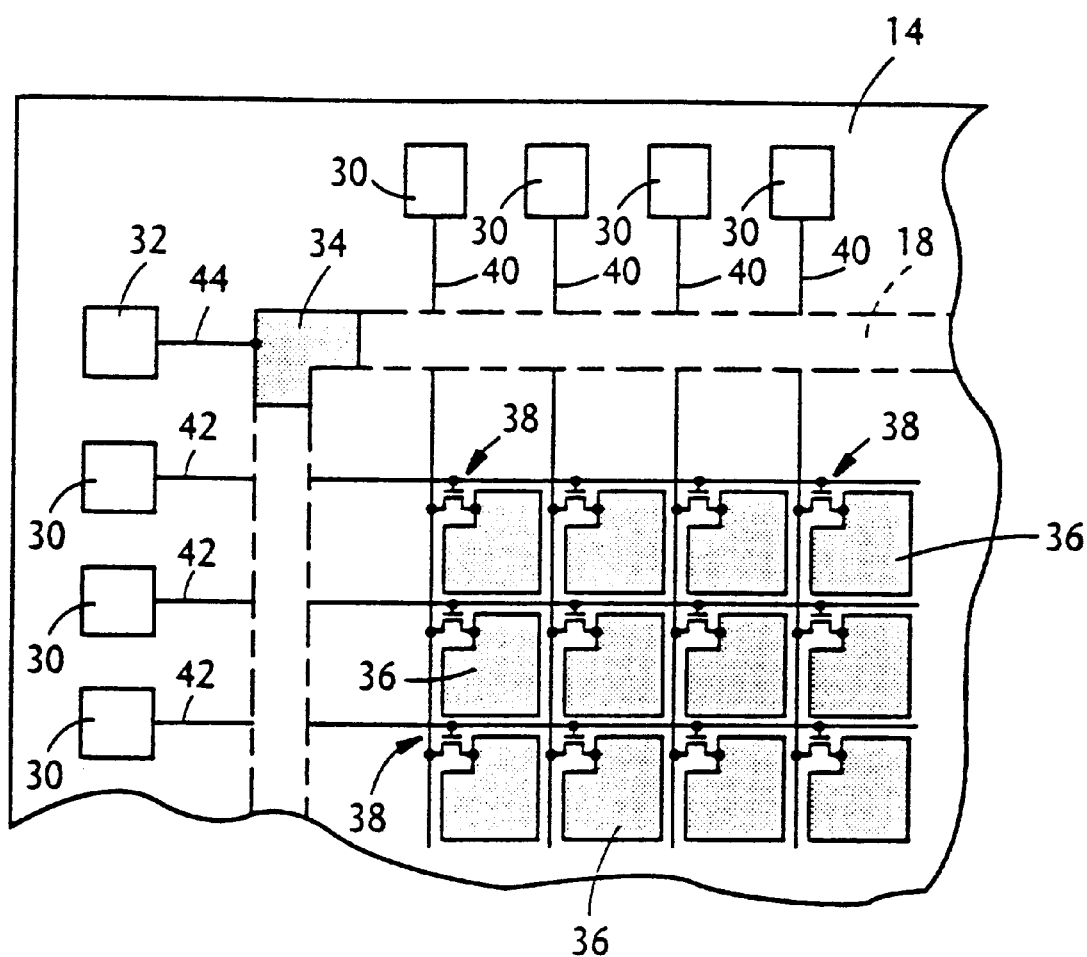
FIG. 2 is a top plan view of part of a TFT substrate of FIG. 1 on which various elements, including TFTs, are disposed.
Figure 3:
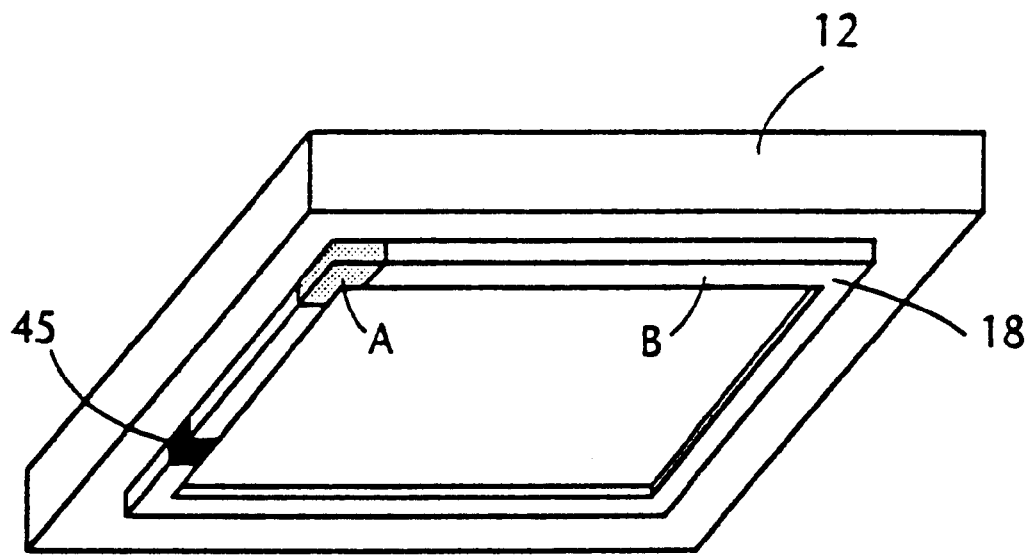
FIG. 3 is a perspective view of a liquid crystal seal provided on a substrate of FIG. 1.

A preferred embodiment of the present invention will be described with reference to FIGS. 4–7 wherein FIGS. 4, 5 and 7 respectively correspond to FIGS. 1–3. To simplify the description of the embodiment, the like elements referred to in FIGS. 1–3 will be represented by like reference numerals.

In brief, the instant embodiment differs from the conventional LCD of FIGS. 1–3 as follows. An electrode corresponding to the electrode 34 is elongated along the periphery of the TFT substrate 14 and, a plurality of electrical paths for discharging static electricity are established between the above mentioned electrode and each of the column/row lines 40 and 42.

Figure 4:
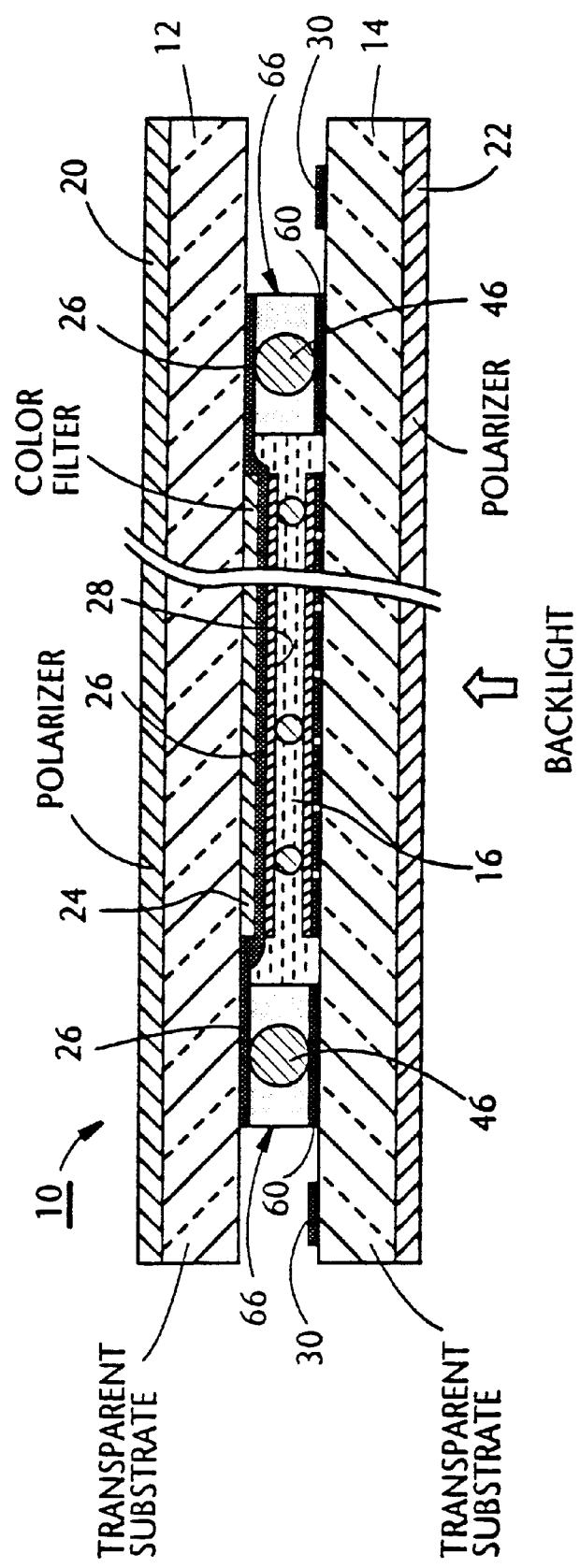
FIG. 4 is a sectional view of an active matrix type LCD embodying the present invention.
Figure 5:
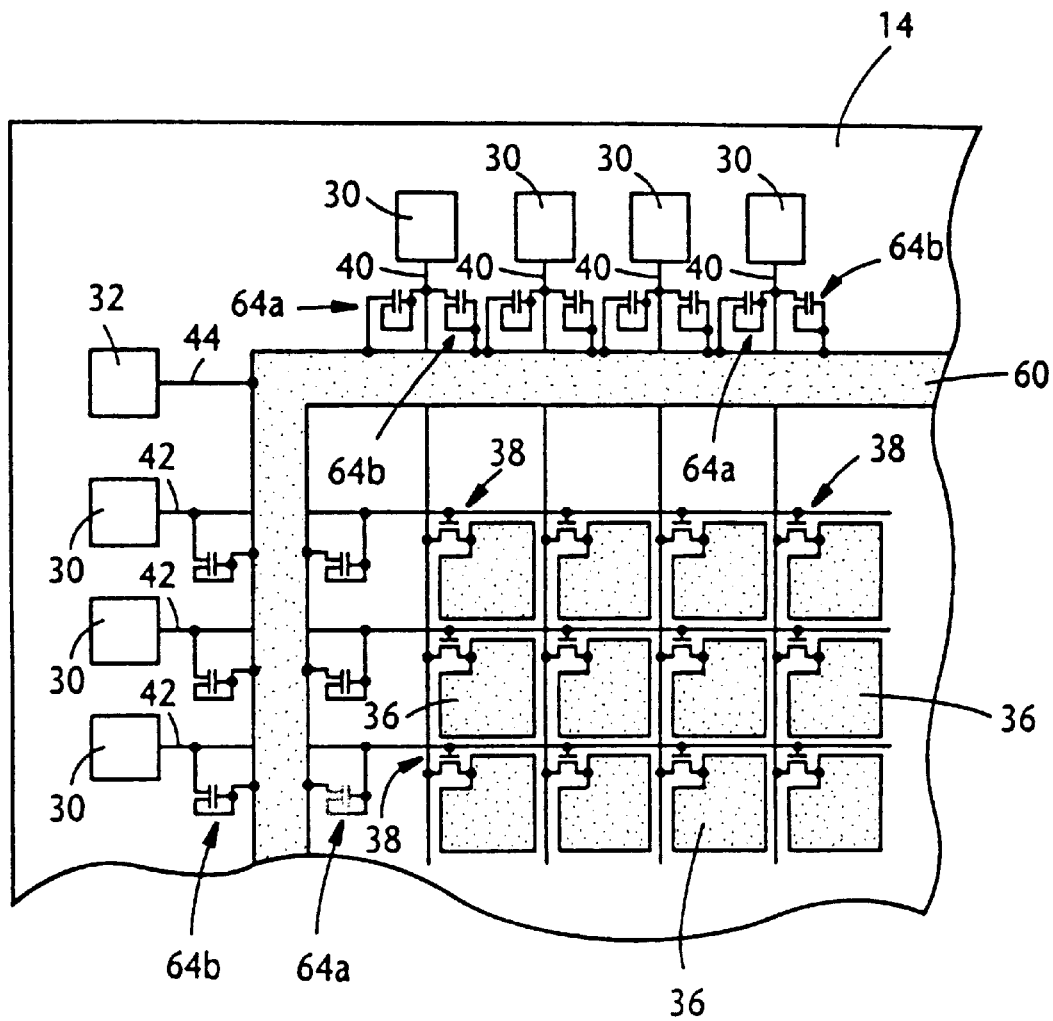
FIG. 5 is a top plan view of part of a TFT substrate of FIG. 4 on which various elements, including TFTs, are disposed.
Figure 6:
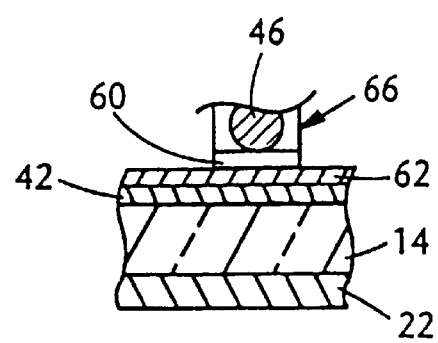
FIG. 6 is a sectional view of part of the TFT substrate of FIG. 5 together with a member formed thereon.

As shown in FIGS. 4 and 5, an electrode 60 is deposited at the periphery of the TFT substrate 14 in a manner to cross the column/row lines 40 and 44 by way of an insulating layer 62 (FIG. 6). Note that the insulating layer 62 is omitted in FIG. 4 for the sake of simplifying the drawing.

A plurality of pairs of shunt transistors 64a and 64b are connected between the electrode 60 and each of the column/row lines 40 and 42. More specifically, the shunt transistor 64a is an n-channel (for example) MOSFET whose drain and gate are coupled to one of the column line 40 (or row line 42) and whose source is coupled to the electrode 60. On the other hand, the shunt transistor 64b is also an n-channel MOSFET whose source is coupled to one of the column line 40 (or row line 42) and whose drain and gate are coupled to the electrode 60. Therefore, if static voltage developed on the column/row lines 40 and 42 (for example) is positive and exceeds a predetermined level, a current path is established through the shunt transistor 64a. On the contrary, if static voltage developed on the column/row lines 40 and 42 (for example) is negative and below a predetermined level, a current path is established through the shunt transistor 64b. That is to say, the transistors 64a and 64b constitute static electricity discharging paths. The above mentioned predetermined level is decided depending on the actual characteristics of the TFTs 38 and the transitors 64a and 64b.

Figure 8:
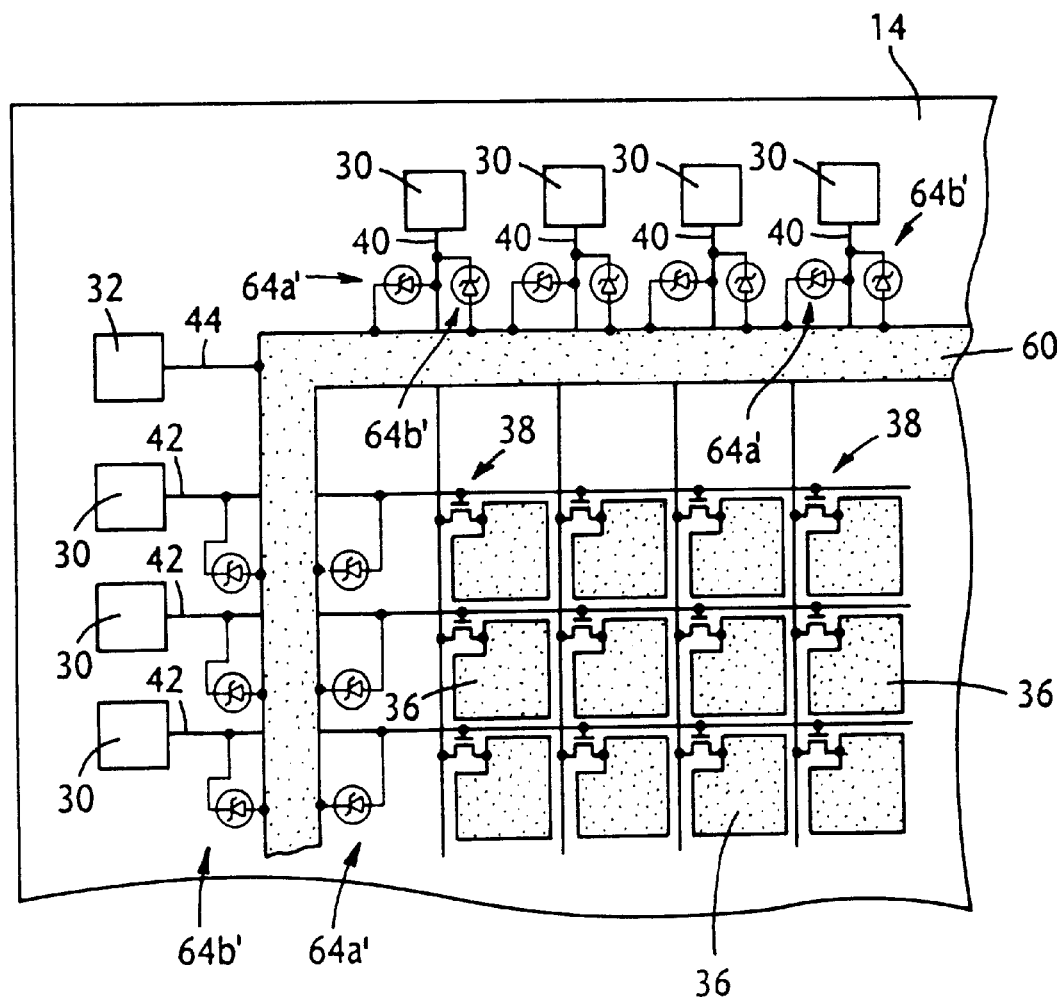
FIG. 8 is a top plan view of part of a substrate, similar to that shown in FIG. 5, on which various elements, including zener diodes, are disposed.

Such discharging paths, however, are not limited to the above mentioned shunt transistors 64a and 64b. As an alternative a plurality of pairs of diodes (inclusive of zener diodes as shown in FIG. 8) may be employed for discharging positive and negative static voltages appearing on the column/row lines. Further, p-channel MOSFETs can be used for the same purpose.

The electrode 60 is coupled to the bonding pad 32 by way of the line 44 which is further coupled to an external voltage source (not shown).

Since the electrode 60 is provided at the periphery of the substrate 14, it is preferable to construct a liquid crystal seal 66, which corresponds to the seal 18 (FIG. 1), so as to include the electrically conductive spacers 46 over the entire seal 66.

Figure 7:
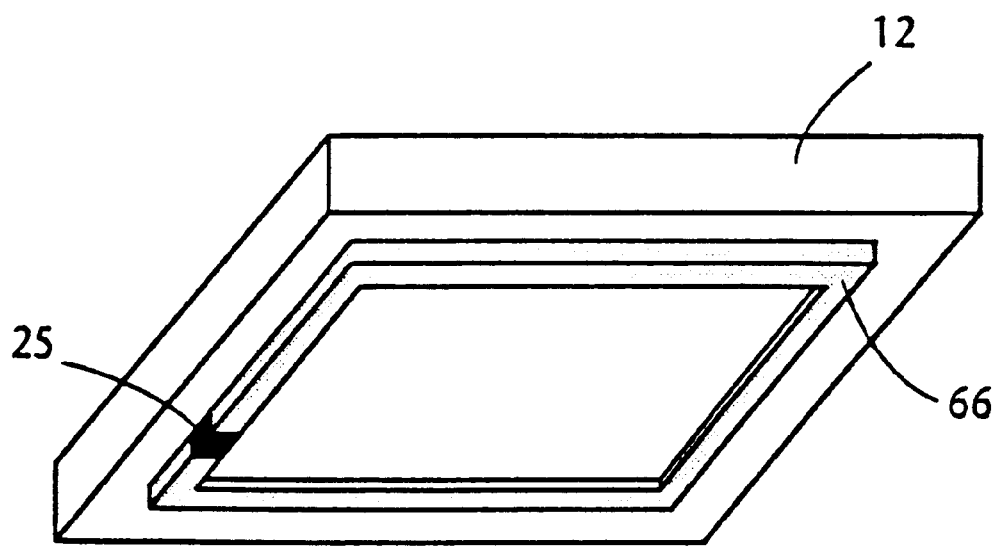
FIG. 7 is a perspective view of a liquid crystal seal provided on one substrate shown in FIG. 4.

The liquid crystal seal 66 is formed, using a known screen printing technique, at the periphery of one major surface of the substrate 12 as schematically shown in FIG. 7. On the other hand, the pixel electrodes 36, the TFTs 38 and the shunt transistors 64a and 64b are deposited on the TFT substrate 14 using ITO (Indium Tin Oxide), Al, and α-Si (Amorphous Silicon) via the well known techniques such as sputtering, lithography, doping, etc. Following this step, Al or Cr is used to deposit, on the TFT substrate 14, the column/row lines 40, 42, the line 44, and the bonding pads 30, 32. Further, the electrode 60 is patterned on the substrate 14 by sputtering Al or Cr. Thereafter, the substrate 12 bearing the seal 66 is aligned and pressed on the TFT substrate 14 under a high temperature ranging from about 150° C. to 230° C., whereby the seal 66 is secured between the substrates 12 and 14.

Finally, a liquid crystal material is injected, through an opening provided in the seal, in a vacuum environment into the space defined by the substrates 12 and 14 and the seal 66. Subsequently, the opening is closed using UV (Ultra Violet) setting resin.

It will understood that the above disclosure is representative of only one possible embodiment of the present invention and that the concept on which the invention is based is not specifically limited thereto.

What is claimed is:

1. A liquid crystal display comprising:

a first transparent substrate having one surface on which a color filter is deposited;

a first electrode entirely covering the color filter;

a second transparent substrate disposed opposite said first substrate and spaced therefrom by a predetermined distance, said second transparent substrate carrying a plurality of pixel electrodes and a plurality of thin film transistors;

a second electrode deposited at a periphery of one surface of said second transparent substrate;

a plurality of lines for controlling the thin film transistors, said plurality of lines including column and row lines deposited on said one surface of said second transparent substrate and respectively extending to the corresponding thin film transistors;

a static voltage discharging member provided between said second electrode and each of said plurality of lines, said static voltage discharging members being responsive to a predetermined static voltage appearing on each of said plurality of lines; and a liquid crystal seal provided on said second electrode in a manner to be sandwiched between said first and second transparent substrates, said liquid crystal seal defining a space for a liquid crystal layer together with said first and second transparent substrates, said liquid crystal seal including a plurality of electrically conductive spacers so as to establish an electrical connection between said first and second electrodes.

* * * * *

UNITED STATES PATENT AND TRADEMARK OFFICE
CERTIFICATE OF CORRECTION

PATENT NO. : 5,946,057
DATED : August 31, 1999
INVENTOR(S) : Tomohiro KUSANAGI

It is certified that error appears in the above-identified patent and that said Letters Patent is hereby corrected as shown below:

Column 3, line 24, delete "composing" and insert --comprising--.

Signed and Sealed this

Twenty-fifth Day of April, 2000

Q. TODD DICKINSON

*Attest:*

*Attesting Officer*  *Director of Patents and Trademarks*